United States Patent
Olsson et al.

(10) Patent No.: US 7,434,398 B2
(45) Date of Patent: Oct. 14, 2008

(54) METHOD FOR BRAKING WITH AN INTERNAL COMBUSTION ENGINE HAVING A VARIABLE TURBO UNIT

(75) Inventors: Goran Olsson, Gothenburg (SE); Per Persson, Partille (SE); Per-Olof Kallen, Vastra Frolunda (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 11/420,706

(22) Filed: May 26, 2006

(65) Prior Publication Data

US 2006/0201151 A1     Sep. 14, 2006

Related U.S. Application Data

(63) Continuation of application No. PCT/SE2004/001684, filed on Nov. 17, 2004.

(30) Foreign Application Priority Data

Nov. 27, 2003   (SE)   ................................. 0303202

(51) Int. Cl.
    *F02D 23/00*   (2006.01)
    *F02D 9/06*    (2006.01)
    *F02D 13/04*   (2006.01)
    *F02B 37/12*   (2006.01)

(52) U.S. Cl. .................. 60/602; 123/323; 123/321

(58) Field of Classification Search .......... 60/600–602; 123/321–323
    See application file for complete search history.

(56) References Cited

U.S. PATENT DOCUMENTS

| | | | |
|---|---|---|---|
| 4,428,199 A * | 1/1984 | Moore et al. .................. 60/600 |
| 5,146,890 A | 9/1992 | Gobert ........................ 123/323 |
| 6,050,093 A * | 4/2000 | Daudel et al. ................. 60/602 |
| 6,062,025 A * | 5/2000 | Okada et al. .................. 60/602 |
| 6,085,526 A * | 7/2000 | Bischoff ....................... 60/602 |
| 6,250,145 B1 * | 6/2001 | Honold et al. ............. 73/119 R |
| 6,543,226 B1 * | 4/2003 | Bischoff et al. ............... 60/602 |
| 6,619,040 B2 | 9/2003 | Conicella ..................... 60/602 |
| 6,652,414 B1 | 11/2003 | Banks, III .................... 60/602 |
| 6,718,767 B1 * | 4/2004 | Caddy .......................... 60/602 |
| 6,883,318 B2 * | 4/2005 | Warner et al. ................ 60/602 |
| 6,996,986 B2 * | 2/2006 | Arnold ......................... 60/602 |
| 7,000,392 B2 * | 2/2006 | Greentree ..................... 60/602 |
| 2003/0172653 A1 | 9/2003 | Mayer et al. .................. 60/602 |
| 2005/0106040 A1 * | 5/2005 | Repple et al. ............... 417/313 |

FOREIGN PATENT DOCUMENTS

EP        1275833 A1    1/2003

\* cited by examiner

*Primary Examiner*—Thai-Ba Trieu
(74) *Attorney, Agent, or Firm*—Novak Druce + Quigg LLP

(57) ABSTRACT

Method for controlling the braking effect during engine braking in an internal combustion engine (10) having an exhaust turbocharger unit (16) with adjustable guide blades for controlling the turbine speed and gas flow. The method includes detection of the engine speed, detection of the adjustment position of the guide blades, measurement either of the charging pressure on the intake side of the engine or the manifold pressure on the exhaust side of the engine, comparison of these data with stored desired values, and adjustment of the guide blades to a desired position which gives a suitable braking effect for the prevailing charging pressure.

3 Claims, 3 Drawing Sheets

METHOD FOR BRAKING WITH AN INTERNAL COMBUSTION ENGINE HAVING A VARIABLE TURBO UNIT

CROSS-REFERENCE TO RELATED APPLICATIONS:

The present application is a continuation patent application of International Application No. PCT/SE2004/001684 filed 17 Nov. 2004 which was published in English pursuant to Article 21(2) of the Patent Cooperation Treaty and which claims priority to Swedish Application No. 0303202-6 filed 27 Nov. 2003. Said applications are expressly incorporated herein by reference in their entirety.

TECHNICAL FIELD AND BACKGROUND OF THE INVENTION

The present invention relates to a method of controlling the braking effect during engine braking in an internal combustion engine having an exhaust turbocharger unit with adjustable guide blades for controlling the turbine speed and gas flow.

In an internal combustion engine having a turbocharger unit with variable turbine geometry (VTG), it is possible to control the gas flow through the turbine. For example, control may be achieved by means of rotatable guide blades upstream of the turbine rotor.

Alternatively a so-called "sliding wall" may be used in order to vary the intake area of the turbine.

In order to control the engine braking effect of a diesel engine which is equipped with VTG and a compression brake, which can be charged by pressure charging of the engine cylinders from the exhaust system, and/or by pressure charging via the intake side of the engine, the turbine guide blades are set to a certain position which will give a certain braking effect. When the braking effect is to be varied, the guide blades are moved, the braking effect being modified since the charging pressure (intake side) and counterpressure in the manifold are adjusted.

In engine braking tests, for example by simulating downhill driving with a heavy vehicle having an engine equipped with VTG, it has been shown that the braking effect is not kept constant when the brake is engaged for some time. This is due to the fact that temperature changes affect the position of the guide blades since guide arms and similar arrangements alter their length. Particular problems may arise, for example, if the guide blades are in a position in which the turbocharger is virtually shut-off. In the aforementioned tests a slight change in the guide blade position was capable of exerting a relatively strong influence on the braking effect. It proved impossible to set the desired braking effect by moving the guide blades to a preselected position. It was partly a problem of longitudinal thermal expansion and partly a problem of the preselected mechanical position varying somewhat from time-to-time due to tolerances.

These problems can mean that the control system becomes slow and unstable with pressure fluctuations on the intake side of the internal combustion engine. Owing to these unwanted pressure fluctuations, problems arise in controlling the braking effect. There is also a risk of reduced comfort and problems of synchronization with other service brakes, such as a retarder, in a vehicle, the brake system of which is controlled by means of the vehicle's various control units. In the worst case it is also conceivable that the braking effect might become too great for components of the drivetrain, if these components are operating close to their strength limit.

When using a turbocharger with variable turbine geometry to control the engine braking effect, it is important to have control of the guide blade position, the charging pressure and possibly also the inlet pressure and the turbine speed, so as to be able to provide a uniform and consistent engine braking action. One method of controlling the guide blades in a turbocharger having variable turbine geometry is disclosed in U.S. Pat. No. 6,085,526. This describes a solution in which the charging pressure and manifold pressure are combined in order to control the braking effect. Further efforts are needed, however, in order to remedy the problems described above. For example, variations in the engine valve lift can affect the manifold pressure which means that the control strategy proposed in the patent cited will not work.

SUMMARY OF INVENTION

An object of the present invention therefore is to provide a method for controlling the braking effect during engine braking in an internal combustion engine having an exhaust turbocharger unit with adjustable guide blades, which means that the required braking effect can be achieved consistently.

This object is achieved in that the method according to the invention is characterized by the following steps: detection of the engine speed, detection of the adjustment position of the guide blades, measurement either of the charging pressure on the intake side of the engine or of the manifold pressure on the exhaust side of the engine, comparison of these data with stored desired values, and adjustment of the guide blades to a desired position which gives a suitable braking effect for the prevailing charging pressure. By means of this method the guide blades of the turbocharger unit can be set to a desired position and the setting can then be directly adjusted, in order to compensate for temperature changes, for example.

BRIEF DESCRIPTION OF THE DRAWINGS

The invention will be described in more detail below with reference to exemplary embodiments shown in the drawings attached, in which.

DETAILED DESCRIPTION

Figure 1:
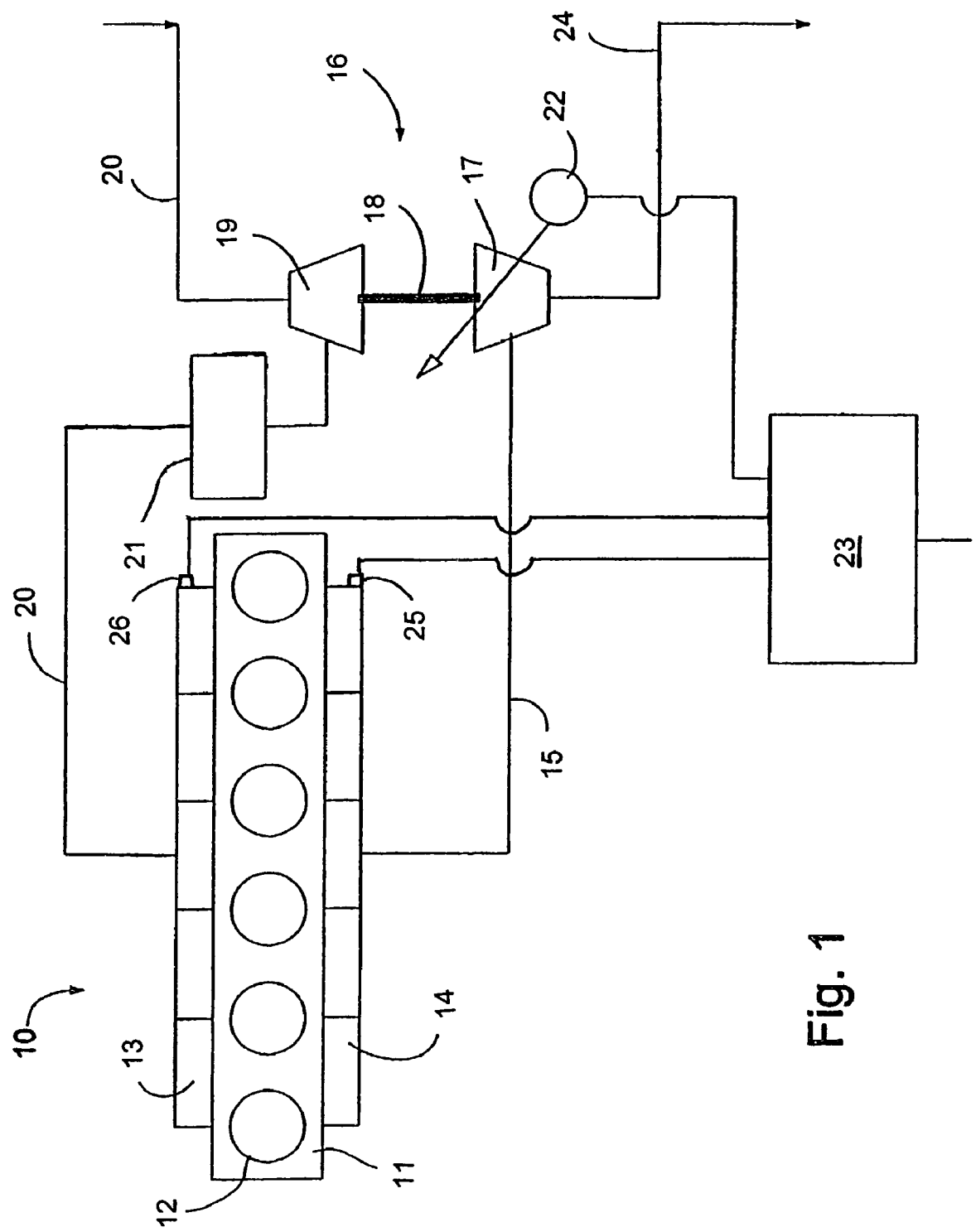
FIG. 1 is a schematic illustration of an internal combustion engine which will permit a control method according to the invention.

The internal combustion engine 10 shown in FIG. 1 comprises an engine block 11 having six piston cylinders 12 with an inlet manifold 13 and an exhaust manifold 14. Exhaust gases are fed via an exhaust gas pipe 15 to a turbine rotor 17 of a turbocharger unit 16. The turbine shaft 18 drives the compressor wheel 19 of the turbocharger unit, which compresses air entering via an intake pipe 20 and delivers it via an air intercooler 21 to the inlet manifold 13.

The turbocharger unit 16 is equipped with variable turbine geometry (VTG), which makes it possible to control the gas flow through the turbine by adjusting one or more adjustable guide blades. The guide blades may comprise rotatable guide blades, for example, which can be adjusted by way of an actuator 22, which is connected to an engine control unit 23 containing a control program and control data for this purpose. According to FIG. 1 the engine control unit 23 is furthermore connected to a pressure sensor 26, which detects the pressure in the inlet manifold pipe 13 and another pressure sensor 25 which detects the pressure in the exhaust manifold 14. However, both of these pressure sensors are not essential for performing the method according to the invention in its simplest form. The engine control unit, in a manner known in the art, has access to the engine speed value.

Exhaust gases which have passed through the turbocharger unit 16 are led out into the atmosphere via an exhaust line 24, which according to the prior art may carry the exhaust gases to equipment for exhaust-gas aftertreatment. In addition, exhaust gases can also be returned to the intake side of the engine as so-called exhaust gas recirculation (EGR).

The engine is equipped with a known compression brake with pressure charging of the engine cylinders from the exhaust system, for example of the type described in U.S. Pat. No. 5,146,890, the disclosure of which is hereby expressly incorporated by reference. The adjustable guide blades of the turbocharger unit can be used as throttle elements for the exhaust gas flow in order to boost the pressure in the exhaust manifold 14 during braking, thereby permitting an increase in the compression resistance. At the same time the guide blades can be adjusted so as to increase the turbine speed, which gives an increased pressure on the intake side and hence increased compression resistance in the engine during braking.

The actuator 22 is suitably provided with position sensors and/or force sensors for the guide blade position. For a given speed $n_1$, a given charging pressure $p_1$ and a given guide blade position $L_1$ will correspond to a braking effect For $n_1$, a guide blade position $L_2$ may also be used, which results in a charging pressure which produces the braking effect $P_2$. This may be repeated for more positions of the guide blades and for more speeds. In addition, force sensors may be used which interact with an exhaust pressure regulator.

Through tests, parameters for P and L are obtained which give the desired braking effect P. These values are used to construct a matrix in the data set of the engine control unit, which is used to control the guide blade position for the desired braking effect.

This can be described in more physical terms as follows. The following terms will be used:
 $L_t$=corrected desired position
 $L_i$=nominal desired position
 $L_k$=correction of guide blade position on the basis of mechanical tolerances and temperature (small figure)
 $P_i$=intake pipe pressure, charging pressure
 $P_g$=pressure in manifold, counterpressure
 n=engine speed speed
 $n_t$=turbine speed Using these terms, the braking effect P may be written as follows:

$P=f(p_i,p_g)n(p_i$ and $p_g$=>air quantity in cylinder=>brake torque, based on data from engine test or calculations),
 $(P_i,P_g)=f(L_t,n_t,n)$, guide blade position, turbine speed and engine speed=>pi and pg, here the outdoor temperature and air density will also have an influence, but are not included.
 $L_t=L_i+L_k=L_i+f(P_i,P_g,n_t,n)$ according to the above.

It will therefore be possible to adjust the braking effect P to its desired value at each point in an effect—speed diagram by mechanically adjusting the guide blades and correcting this position by measuring $P_i$, $P_g$ and $n_t$.

Figure 2:
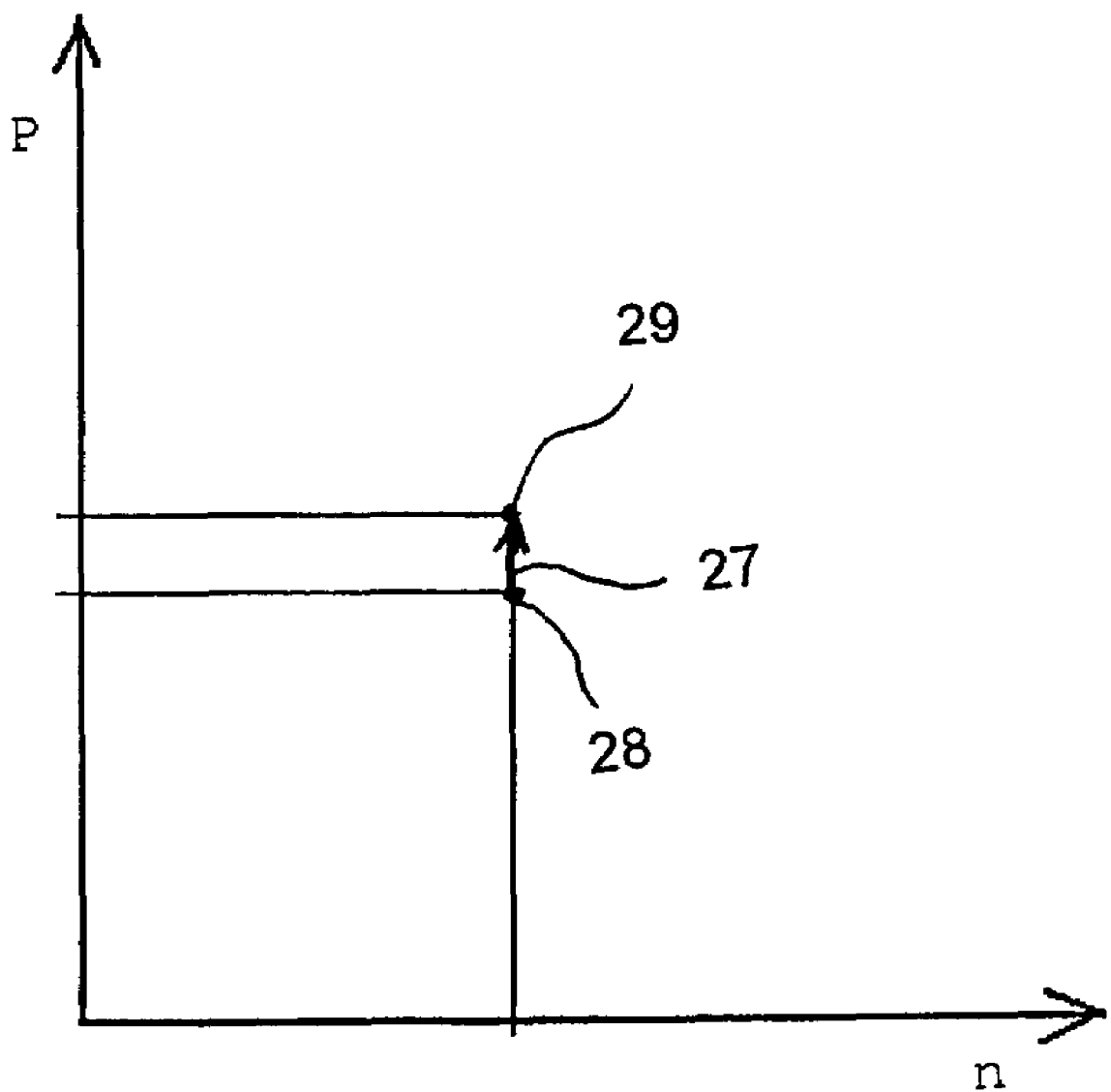
FIG. 2 shows a graphical representation of the control method.

FIG. 2 illustrates the method according to the invention in a pressure/speed diagram, in which the arrow 27 indicates an adjustment of the guide blade position from a first adjustment position 28 to a second adjustment position 29, the second adjustment position giving a greater braking effect P.

Figure 3:
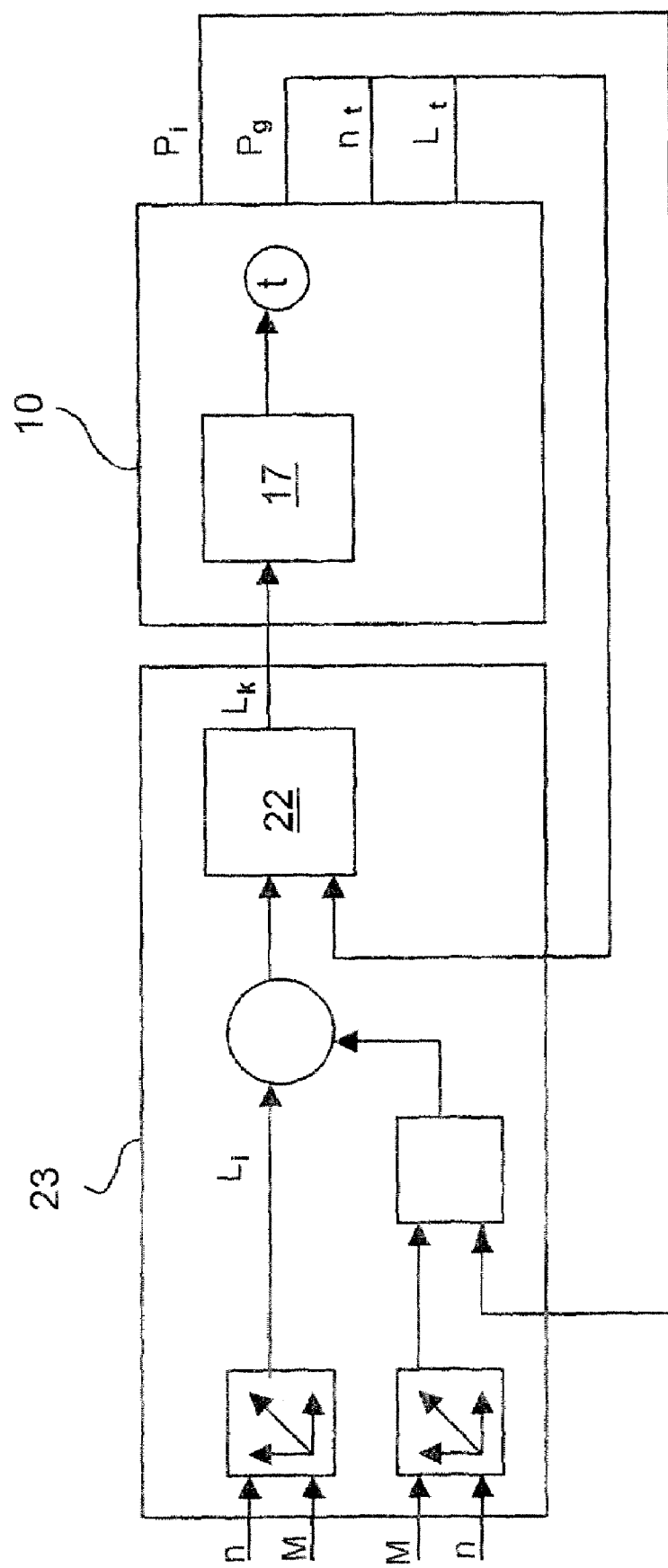
FIG. 3 is a flow chart illustrating the control method according to the invention.

FIG. 3 shows the same method as FIG. 2 in a flow chart with logic units of the engine control unit 23 and the variable turbine 17 belonging to the engine 10. The flow chart illustrates how the engine control unit uses registered engine data including engine speed, n, and torque, M to influence the turbine actuator 22, which in turn corrects the turbine 17 in a so-called closed loop.

The invention must not be regarded as being limited to the exemplary embodiment described above, a number of further variants and modifications being feasible without departing from the scope of the following claims.

What is claimed is:

1. A method of controlling the braking effect during engine braking in an internal combustion engine having an exhaust turbocharger unit with adjustable guide blades for controlling the turbine speed and gas flow said method comprising:
 detecting an engine speed;
 detecting an existing adjustment position ($L_1$) of the guide blades;
 measuring a charging pressure ($P_i$) on an intake side of the engine;
 measuring a manifold pressure ($P_g$) on an exhaust side of the engine; and
 comparing these measured and detected data with stored desired values and adjusting the guide blades to a desired position ($L_2$) that produces a suitable charging pressure ($P_i$) for the desired braking effect (P).

2. The method as recited in claim 1, further comprising detecting a speed of the turbocharger unit (16).

3. The method as recited in claim 1, further comprising initially selecting a guide blade setting that gives a low braking effect and then adjustment of the guide blades to a greater braking effect.

* * * * *